United States Patent Office 3,452,778
Patented July 1, 1969

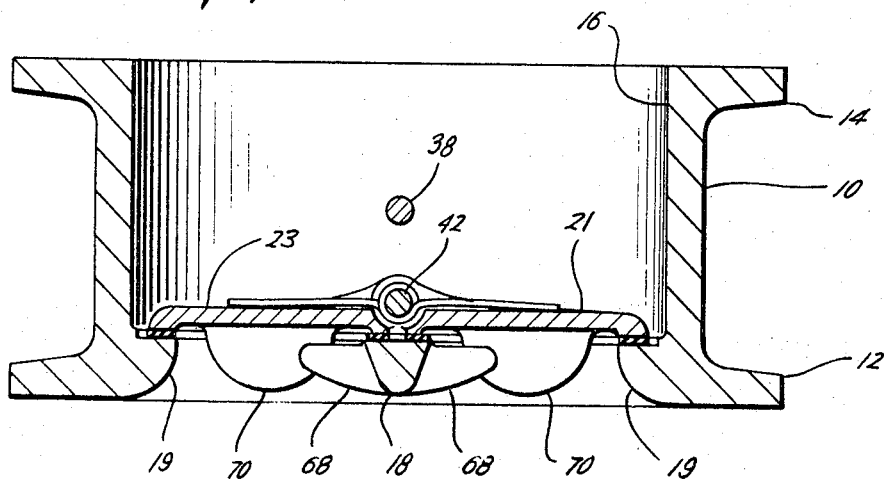
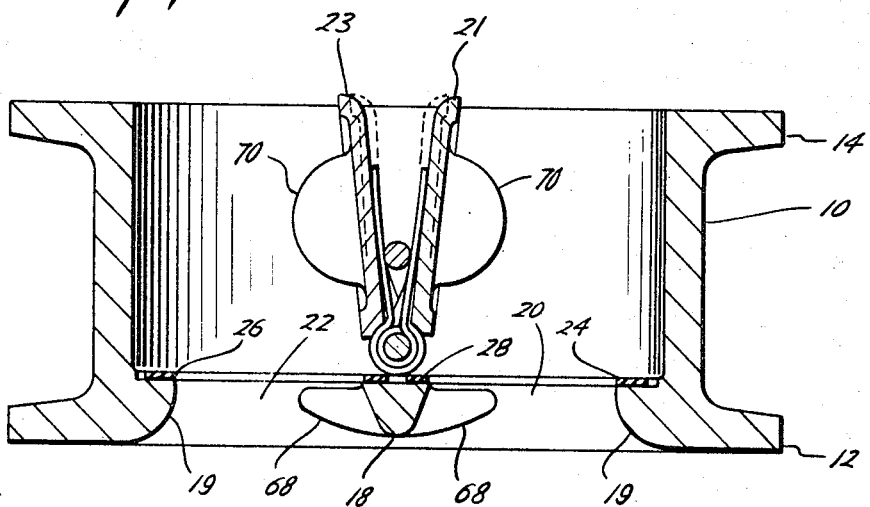
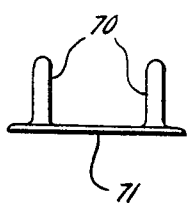
Willis Babcock
INVENTOR.

3,452,778
CHECK VALVE
Willis Babcock, Houston, Tex., assignor, by mesne assignments, to Mission Manufacturing Company, a corporation of Delaware
Filed Feb. 18, 1966, Ser. No. 528,580
Int. Cl. F16k 21/04, 15/03; F23l 13/02
U.S. Cl. 137—512.1                    3 Claims

ABSTRACT OF THE DISCLOSURE

A check valve having a body defining a bore, a cross arm extending across the bore, valve plates pivotally mounted in the bore and adapted to seat on said cross arm when opening the edges of the mounting plates being out of the flow path of liquid, and a plurality of resilient vanes positioned in the flow paths.

---

The present invention relates to fluid flow check valves and, in particular, to an improvement in fluid flow check valves having at least two pivotally mounted plates which are adapted to remain seated to prevent flow in one direction and to pivot away from the seat to allow flow in the opposite direction.

Fluid flow check valves utilizing at least two pivotally mounted plates have been used with considerable success. However, difficulties have been encountered in that the pressure drop of the fluid flowing through the check valve has been greater than desired. Additionally, some difficulty has been encountered with these prior structures from failure of the resilient means which urges the valve plates to closed position. Failure of such means has, on occasion, resulted in the valve remaining open when the fluid flow direction has reversed.

It is, therefore, an object of the present invention to provide an improved check valve having a minimum turbulence to minimize pressure loss during flow through the valve.

Another object is to provide an improved check valve with means to assure the valve plates close whenever flow through the valve tends to reverse direction to prevent a reverse flow through the valve.

A further object is to provide a combination check valve and acoustic filter having minimum pressure loss during flow through the valve and attenuation of noise resulting from flow through the valve.

Still another object is to provide an improved check valve which may be readily inserted in a flow line having stream line flow and minimum noise characteristics.

A still further object is to provide an improved check valve with at least two pivotal valve plates and stop means limiting the opening movement of such plates to less than a 90° angle in relation to the closed position of such plates and wherein said stop means has sufficient contact area with said plates when open to minimize wear and to avoid a change in the maximum open position of the valve plates.

The construction designed to carry out the invention will be hereinafter described, together with other features thereof.

The invention will be more readily understood from a reading of the following specification and by reference to the following drawings forming a part thereof, wherein an example of the invention is shown and wherein:

FIGURE 3 is a cross-sectional view taken along line 3—3 in FIGURE 2 and illustrating the valve plates in closed position; and FIGURE 4 is a sectional view similar to FIGURE 3 with the check valve of the present invention showing the open position of the valve plates and additionally showing the maximum opening of the valve plates;

FIGURE 5 is a detail elevation view of one of the streamlining vane units.

Figure 1:
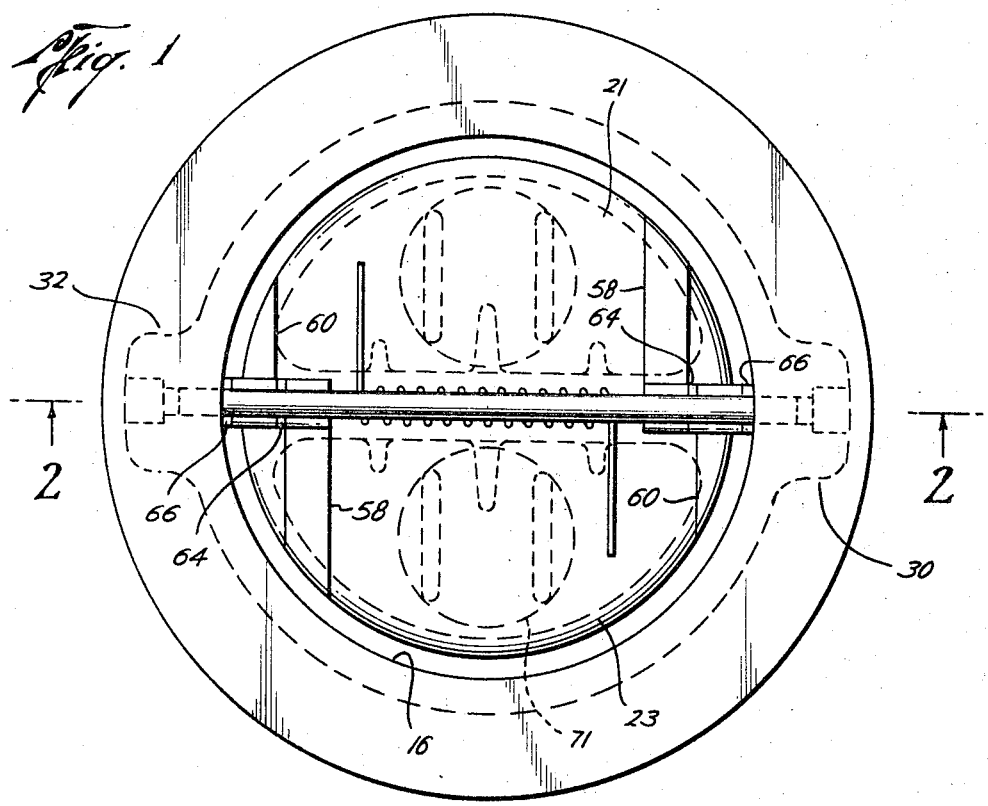
FIGURE 1 is an end view of the improved check valve of the present invention looking into the downstream side thereof.
Figure 2:
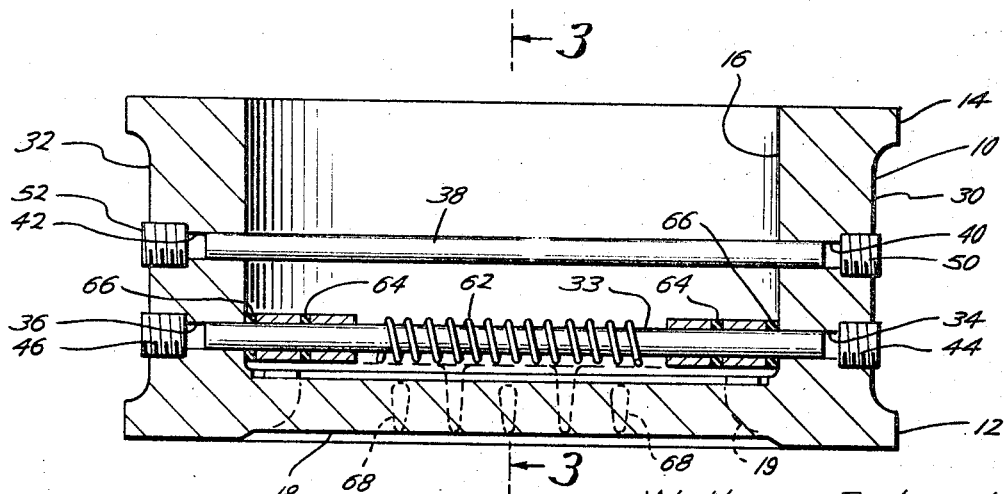
FIGURE 2 is a sectional view of the check valve of the present invention taken along line 2—2 in FIGURE 1 and illustrating the hinge connection and stop means.

The check valve of the present invention is of the pivoting plate type of check valves with two plates mounted to engage a seat on the interior of the valve when closed and to pivot away from the seat when open. The check valve has a generally tubular body 10 with an outwardly projecting upstream flange 12, an outwardly projecting downstream flange 14 and a central bore 16 extending therethrough. The cross arm 18 extends diametrically across the central bore 16 and, as shown, is made an integral part of the body 10 at its upstream end. The upstream portion of the body 10 projects inwardly at 19 in a smooth or streamlined curve and cooperates with the cross arm 18 to define the two flow areas 20 and 22. The upstream portion of the cross arm 18 is rounded to present a streamlined configuration to the flow of fluids through the check valve. The inward projection 19 of the inlet portion of the body 10 cooperates with the cross arm 18 to provide seat areas 24 and 26 facing in a downstream direction and surrounding the flow areas 20 and 22, respectively. The valve plates 21 and 23 are pivotally mounted to engage the seat areas 24 and 26 and to thereby prevent a reverse flow through the flow areas 20 and 22. A suitable resilient material 28 is positioned on the seat areas 24 and 26 to define the valve seats surrounding the flow areas 20 and 22 and against which the valve paltes 21 and 23 seat when closed. The exterior of the body 10 is provided with the vertically extending bosses 30 and 32 diametrically opposite each other and positioned in general alignment with the cross arm 18.

The mounting means for the valve plates 21 and 23 includes the mounting pin 33 which is positioned across the bore 16 in alignment and close to the cross arm 18. The bores 34 and 36 through the bosses 30 and 32, respectively, are provided to receive the mounting pin 33 and are diametrically opposite each other and in alignment with the cross arm 18. The outer ends of the bores 34 and 36 are suitably tapped to receive a closure plug to retain the mounting pin 33 in position. The mounting pin 33 is secured in the bores 34 and 36 by the insertion of the plugs 44 and 46 into the outer threaded portions of such bores. Similarly, the bores 40 and 42 extend through the body 10 at the bosses 30 and 32, are spaced downstream from the bores 34 and 36 and are in diametric alignment with each other extending in a direction generally parallel to the cross arm 18. The stop means or stop bar 38 is similarily positioned with its ends in the bores 40 and 42, respectively, and, as shown in the drawings, is spaced downstream from the mounting pin 33 in parallel relationship thereto. The stop bar 38 is secured in the bores 38 and 40 by the plugs 50 and 52 which are threaded into the outer ends of such bores.

The mounting pin 33, by being close to the heels of the valve plates and also to the seat area of the cross arm 18, positions the valve plates in opened position with their heels behind the cross arm 18 and out of the streamline flow. The valve plate heels do not create any turbulence to the flow of fluids through the flow areas 20 and 22.

The valve plate assembly is mounted on the mounting pin 33. The valve plates 21 and 23 each have integral hinge arms 58 and 60 through which the mounting pin extends to hold the valve plates 21 and 23 in position downstream of the seat areas 24 and 26. The bores in the hinge arms 58 and 60 are slightly larger in diameter than the diameter of the mounting pin 33 to allow a slight movement of the valve plates 21 and 23 in an axial direction with respect to the body 10. Resilient means, such as spring 62, is provided to urge the valve plates 21 and 23 into the seated position on the resilient seat material 28 in the seat areas 24 and 26. The particular spring 62 is helically wound around the mounting pin 33 and has its ends extended outwardly past the centroid of the respective plates 54 and 56. The spring is biased to push in an upstream direction on the downstream face of the valve plates to urge them toward their closed position. Suitable spacers 64 and 66 are positioned around mounting pin 33 between the hinge arms 58 and 60 of the opposite plates and also between the respective hinge arms 60 and the central bore 16 of the body 10. The spacers 64 and 66 are shown to be of a plastic material which will properly space the hinge arms from each other and properly position the valve plates 21 and 23 over the flow areas 20 and 22. It is also preferred that these spacers be of a material which has limited frictional resistance to movement, such as polytetrafluoroethylene or other similar material.

The angle of opening of the valve plates is limited by the stop bar 38. As previously mentioned, the stop bar 38 is mounted diametrically across the bore 16 through the body 10 in parallel relationship to the mounting pin 33 and the cross arm 18. Additionally, the stop bar 38 is of a preselected diameter and spaced from the mounting pin 33 a preselected distance to allow the valve plates to open at their maximum opening to a position which is at least a slight angle to the direction of flow through the body. Stated another way, the stop bar 38 prevents the valve plate from traveling a full 90° in opening. As shown in FIGURE 4, portions of the hinge arms 58 and 60 on each of the valve plates 21 and 23 engage the stop bar 38 on opening to prevent further opening movement of the valve plates except that slight movement which may take place because of the difference in the diameters of the mounting pin 33 and the bores through the hinge arms 58 and 60. Such additional movement, because of this difference in diameters, is the position shown in the dashed lines in FIGURE 4. This maximum open position of the valve plates is approximately 80° to 85° with respect to the original seated position of each of the valve plates and forms a very small angle with the direction of flow. This slight angle in relation to flow direction will cause the valve plates to be returned to their seats whenever flow through the bore 16 tends to reverse direction even when the spring 62 is completely inoperative.

The streamlined or smooth configuration of the upstream entrance to the flow areas 20 and 22 is aided by suitable streamlining means attached to the cross arm 18, such as the illustrated flexible vanes 68. The vanes 68 are bonded to cross arm 18 with a suitable bonding agent and project outwardly into the flow areas 20 and 22 on either side of the cross arm 18 and extend in a direction parallel to the flow through the flow areas. These vanes are preferably of a material and a related thickness to be sufficiently flexible to function as streamlining and noise-attenuating vanes. The exposed edges of the vanes 68 are shown to be rounded but may be made any suitable streamlined shape, such as, for example, a sharp edge. The particular configuration of vanes illustrated in the drawings is designed to be made of a relatively flexible material. However, it is within the scope of the invention to construct the vanes 68 to be much thinner in comparison to their other dimensions, whereby, even when made of a metallic material, they will have the desired flexibility to accomplish both the streamlining of the flow and attenuation of the noise. The center vane of the vanes 68 extends outwardly into the flow area a greater distance than the outer of the vanes 68.

Additional streamlining of flow and noise attenuation is accomplished by the streamlining means attached to the valve plates 21 and 23. Such means includes the flexible vanes 70. These vanes 70 are made up in pairs, and one pair of the vanes 70 is attached to the upstream face of each of the valve plates 21 and 23. Vanes 70 have a substantial height so that they project into the flow area downstream of the seat area a substantial distance and extend in a direction parallel to the flow direction through the flow areas in order to accomplish streamlining of the flow and noise attenuation. The exposed edges of the vanes 70 are shown to be rounded but may be made any suitable streamlined shape, such as, for example, a sharp edge. These vanes are generally molded from a relatively flexible material to have an integral base 71. The base 71 is used to secure the vanes to the upstream face of each of the valve plates. The vanes 70 are flexible to the same degree that the vanes 68 are made flexible. Such flexibility may be accomplished with the vanes 70 by a relatively thick flexible material or, when using a relatively inflexible material, by making the vanes relatively thin in relation to their height to allow it a sufficient degree of flexibility to accomplish the desired streamlining of flow and noise attenuation. A typical example of straightening vanes 68 and 70 for use in a six-inch diameter valve would be to have a thickness of three-sixteenths of an inch and a height of one inch and be made of a butyl rubber or a fluorocarbon rubber having a durometer hardness of 60 or less.

In operation the check valve will be installed in a fluid flow line between flanges with suitable means (not shown) to locate the check valve in the proper axial relation to the flow line. Such means may include positioning of the valve body 10 with the outer periphery of its flanges 12 and 14 in engagement with the inner portion of the bolts holding the adjoining flanges together. With the valve thus installed, it is in the normally closed position because of the urging of the spring 62 against the downstream face of the valve plates 21 and 23. As soon as a slight pressure is built up on the upstream face of the valve plates, this pressure will first move the heels of both of the valve plates a short axial distance, the slight distance of movement which is allowed by the differences in diameter between the bores through the hinge arms 58 and 60 and the diameter of the mounting pin 33. This slight movement of the heels of the valve plates out of engagement with the resilient seating material 28 minimizes the wear between the heels and the seat material 28 which would occur from a sliding movement of the pivoting of such heels during the initial pivotal movement. This initial movement results from the force of the spring 62 being exerted at a point outboard of the centroid of each of the valve plates while the pressure is generally exerted at the centroid and will cause the lifting of the heels of the valve plates first. Thereafter, the force of spring 62 is overcome and flow through the device causes the valve plates 21 and 23 to pivot about the mounting pin 33.

When the flow increases to such an extent that the valve plates 21 and 23 are fully opened, the stop bar 38 will be engaged by the extension of the hinge arms and thus prevent the further opening of the valve plates. The normally opened position of the valve plates is illustrated in the solid lines in FIGURE 4, while the dashed lines illustrate the possible extension of such full opened position resulting from the differences in diameter between the mounting pin 33 and the bores through the hinge arms 58 and 60. The size and position of the stop bar 38 is preselected to limit this maximum opening position of valve plates 21 and 23 to have at least a divergence and each valve plate to be at a slight angle with respect to the flow direction. Thus, the valve plates are not allowed to attain a position in which forces of reverse flow would hold them open.

When the valve plates 21 and 23 are fully opened, as illustrated in FIGURE 4, the heels of the plates are behind the cross arm 18, and such heels do not project into the streamlined flow of fluids through flow areas 20 and 22. This configuration greatly reduces turbulence in the flow of fluids through the valve.

When the valve plates 21 and 23 are only partly open, the streamline flow through the device creates a pressure on the upstream faces of the valve plates, and a lower pressure on the downstream faces of the valve plates. This pressure differential allows the valve plates to open readily and minimize pressure drop through the check valve at low flow rates. This assistance of creating the pressure differential across the plates results from the streamlined flow. When turbulence occurs in the device, this pressure differential effect is practically negated.

The flexibility of vanes 68 and 70, which project into the flow areas 20 and 22 in general longitudinal alignment with the preferred flow direction, functions to reduce turbulence and to maintain streamlined flow through the flow areas 20 and 22. Additionally, these flexible vanes function as noise suppressors or attenuators. It is important that the flexible vanes 68 and 70 project outwardly into the flow areas 20 and 22 a substantial distance to accomplish this streamlining of the flow. If desired, additional flexible vanes may be incorporated in the body inlet configuration to further assist in the reduction of turbulence and the suppression of noise. Such vanes could be secured to the body 10 to extend radially into the flow areas in parallel relation to the direction of flow.

With the valve plates 21 and 23 in the fully opened position, as illustrated in the dash lines in FIGURE 4, they always return to their closed position even without the assistance of the spring 62 whenever the flow tends to reverse since the flow is trapped between the plates at their downstream side and thereby creates a force resulting from the slight angle of the plate to the reversed direction of flow, which force causes the plate to pivot to closed position. This slight angle of the valve plate with respect to the general axis of flow is set up as aforementioned by the specific relationships of configuration, including the distance of the stop bar 38 from the mounting pin 33, the projection of the hinge arms 58 and 60 above the downstream surface of the valve plates 21 and 23 and also the diameter of the stop bar 38. Additionally, the engagement between the stop bar 38 and the hinge arms 58 and 60 is over the entire width of each of the hinge arms. Wear of the contacting surfaces of these parts is negigible and the stop arm 38 prevents the valve plates from opening to an angle approaching a right angle with their closed position.

The improved valve of the present invention provides a flow path which is streamlined to minimize the turbulence and also the pressure losses in the flow through the valve. The streamlining is accomplished partly by the smoothly curved contours of the upstream portions of the body and the cross arm, partly by so mounting the valve plates that the valve plate heels do not project into the flow areas when open and partly by the flexible vanes. The flexible vanes assist in streamlining the flow through the valve and also suppress noise in the flow through the valve to thereby function as an acoustic filter. The stop bar prevents the valve plates from opening a full 90° by the pre-selected relationship of its diameter and distance from the mounting pin. This limit to the full opening assures that the valve plates always close when the flow through the valve tends to reverse directions even if the spring has failed.

What is claimed is:
1. A check valve, comprising
   a body having a central bore therethrough,
   a cross arm extending across the bore of said body and dividing said bore into two flow areas,
   valve seats surrounding said flow areas,
   a pair of valve plates pivotally mounted to said body in said bore to engage said valve seats, and
   a pair of flexible vanes secured to said cross arm extending a substantial distance into each of said flow areas and positioned in a plane parallel to the desired direction of flow through said flow areas to streamline the flow of fluids.
2. A check valve, comprising
   a body having a central bore therethrough,
   a cross arm extending across the bore of said body and dividing said bore into two flow areas,
   valve seats surrounding said flow areas,
   a pair of valve plates pivotally mounted to said body in said bore to engage said valve seats, and
   a pair of flexible vanes secured to each of said valve plates extending a substantial distance into each of said flow areas and positioned in a plane parallel to the desired direction of flow through said flow areas to streamline the flow of fluids.
3. A check valve, comprising
   a body having a central bore therethrough,
   a cross arm extending across the bore of said body and dividing said bore into two flow areas,
   valve seats surrounding said flow areas,
   a pair of valve plates pivotally mounted to said body in said bore to engage said valve seats,
   a pair of flexible vanes secured to said cross arm, and
   a pair of flexible vanes secured to said valve plates,
   said flexible vanes all extending a substantial distance into said flow areas and positioned in a plane parallel to the desired direction of flow through said flow areas to streamline the flow of fluids.

References Cited

UNITED STATES PATENTS

| 1,238,878 | 9/1917 | Bravo | 137—512.1 X |
| 1,570,907 | 1/1926 | McKee | 251—127 X |
| 2,864,397 | 12/1958 | Patterson | 251—118 X |
| 2,877,792 | 3/1959 | Tybus | 137—512.1 |
| 2,969,492 | 1/1961 | Wheatley | 137—527.8 X |
| 2,976,882 | 3/1961 | Cowan | 137—512.1 |
| 3,026,901 | 3/1962 | Wheeler | 137—512.1 X |
| 3,122,156 | 2/1964 | Kersh | 137—525.3 X |

CLARENCE F. GORDON, *Primary Examiner.*

DAVID J. ZOBKIW, *Assistant Examiner.*

U.S. Cl. X.R.

137—527.8